3,511,884
METHOD OF MAKING CYCLOPENTYLLITHIUM
William Novis Smith, Jr., Exton, Pa., assignor to Foote Mineral Company, Exton, Pa., a corporation of Pennsylvania
No Drawing. Filed Nov. 28, 1967, Ser. No. 686,334
Int. Cl. C07f 1/02
U.S. Cl. 260—665  6 Claims

ABSTRACT OF THE DISCLOSURE

One mol of a cyclopentyl halide is reacted with two mols of lithium metal in a defined cyclic hydrocarbon solvent to provide a concentrated solution of cyclopentyllithium.

BACKGROUND OF THE INVENTION

The present invention relates to a method for preparing cyclopentyllithium; and, more particularly, the invention relates to an improved method for making cyclopentyllithium, in the form of a concentrated solution, involving the reaction:

$$RCl + 2Li \rightarrow RLi + LiCl$$

The preparation of cyclopentyllithium by reacting a cyclopentyl halide with lithium metal is reported in the literature [D. E. Appelquist et al., J. Am. Chem. Soc., 85, 743 (1963)] where the solvent used was pentane. U.S. Pat. 3,293,313 relates generally to the preparation of organo lithium compounds in organic solvent media from an organic halide and lithium using, however, a substantial proportion of sodium to provide, selectively, the desired organo lithium compound and by-product NaCl.

The solubility of cyclopentyllithium in pentane is only about 0.8 molar at room temperature. Since cyclopentyllithium is prepared by reacting a cyclopentyl halide with lithium metal in a solvent and since it is desirable to market the resulting cyclopentyllithium in the form of a solution, such relatively dilute solution presents problems in that, during manufacture, subsequent handling, storage and marketing, a large amount of solvent must be utilized. It would be highly desirable if the cyclopentyllithium could be prepared and marketed in the form of a more highly concentrated solution.

Accordingly, it is the principal object of the present invention to provide a method for preparaing cyclopentyllithium in the form of a more highly concentrated solution than heretofore available.

This and other objects will become apparent from a consideration of the following specification and the claims.

SUMMARY OF THE INVENTION

The method for preparing cyclopentyllithium in accordance with the present invention comprises reacting one mol of a cyclopentyl halide with two mols of finely-divided lithium metal in a cyclic hydrocarbon solvent having a total number of carbon atoms from 5 to 10, the concentration of the reactants being such as to provide cyclopentyllithium in a concentration in said solvent of over one molar.

It has been found that, by carrying out the reaction in the aforesaid cyclic hydrocarbons, as much as a 3-fold increase in concentration of the resulting cyclopentyllithium can be obtained as compared to carrying out the reaction in an open chain aliphatic hydrocarbon. Thus, whereas carrying out the stated reaction in pentane, isooctane or hexane, respectively, provides solutions saturated with respect to the cyclopentyllithium at concentrations of 0.80, 0.79 and 0.96 molar, respectively, at 22° C., carrying out the same reaction in cyclopentane, cyclohexane, methylcyclohexane and benzene, respectively, provides cyclopentyllithium in concentrations therein of 2.89, 2.78, 2.57 and 2.8 molar, respectively, at saturation at 22° C.

One of the initial reactants is a cyclopentyl halide, specifically the chloride or the bromide.

The other principal reactant is lithium metal. The lithium employed will advantageously be finely-divided; that is, in the form of small pieces, like cut wire, or, preferably, in well known dispersion form. Such dispersions are prepared by rapidly stirring molten lithium metal into an inert liquid, such as mineral oil or toluene, so that the metal solidifies as very tiny droplets, generally no more than about 100 microns in size and most usually from about 25 to about 75 microns in size. The finely-divided lithium metal may be filtered from the liquid to provide, after washing and drying, what is known as dry dispersion, or, after simply removing the bulk of the liquid as by filtering or decanting, the lithium may be washed with and reslurried in another liquid, such as the cyclic hydrocarbon which will serve as the reaction medium in the present process.

Advantageously, a small amount of sodium will be included with the lithium, as by adding sodium to the molten lithium in preparing the above-described dispersion. The amount of sodium so added will generally range from about 0.3 to about 2%, and preferably from about 0.5 to about 1%, by weight, based on the weight of the lithium.

The method of the present invention is carried out in a cyclic hydrocarbon solvent containing a total of from 5 to 10 carbon atoms. The hydrocarbon may be a simple, unsubstituted cycloaliphatic hydrocarbon such as cyclopentane, cyclohexane, cyclooctane, Decalin (decahydronaphthalene) and the like, or may be a lower alkyl-substituted cycloaliphatic hydrocarbon, such as methylcyclopentane, dimethylcyclopentane, isopropylcyclopentane, methylcyclohexane, dimethylcyclohexane, butylcyclohexane and the like. The hydrocarbon may be benzene or a lower alkyl-substituted benzene, such as toluene, xylene, ethyl benzene, isopropyl benzene (cumene), butyl benzene mesitylene, and the like. The hydrocarbon may also be a partially saturated aromatic hydrocarbon like Tetralin (tetrahydronaphthalene). By lower alkyl substituent is meant an alkyl group containing no more than 4 carbon atoms. The presently preferred hydrocarbons are cyclopentane, cyclohexane, methylcyclohexane and benzene.

In carrying out the present method, the lithium is preferably initially incorporated in the cyclic hydrocarbon, and the cyclopentyl halide is then added. In accordance with preferred practice, the lithium (dispersion) is initially dispersed in the cyclic hydrocarbon, and the cyclopentyl halide is added to the lithium dispersion.

The reaction stoichiometrically requires two molecules of lithium for each molecule of cyclopentyl halide, one molecule of lithium forming the cyclopentyllithium product and the other molecule forming the by-product lithium halide. In accordance with preferred practice, a slight excess of lithium metal, such as up to about 10% excess, is employed.

The concentration of reactants in the cyclic hydrocarbon solvent will be such as to provide a concentration of product cyclopentyllithium of over 1 molar and up to saturation. Since the mols of cyclopentyllithium are equivalent to that of the starting cyclopentyl halide, this means that the amount of cyclopentyl halide will be over 1 molar and preferably at least 2 molar, with respect to the solvent.

The temperature employed during the reaction may be room temperature, or may be below room temperature, as down to about 15° C.; on the other hand, the temperature may go well above room temperature, such as up to about 60° C. A preferred temperature range is from about 30 to about 50° C.

Following the reaction, the lithium halide which is formed may be removed from the cyclopentyllithium solution, as by centrifuging or filtration. The resulting solution may be used or marketed as such, or the cyclopentyllithium may be recovered therefrom by removing the solvent.

The following examples are given for the purpose of illustration and are not intended to limit the scope of the invention in any way:

EXAMPLE 1

A round-bottom, 3-necked, 500 ml. flask is equipped with a stirrer, pressure-equalizing dropping funnel, reflux condenser and thermometer, and is flushed with argon. The flash is then charged with 16 g. of lithium dispersion containing 1% of sodium, and 200 ml. of sodium-dried cyclopentane. Cyclopentyl chloride (120 g.) is added over a period of 1¾ hours at reflux. The mixture is stirred for an additional hour and allowed to cool to room temperature. The resulting solution contains a large amount of cyclopentyllithium crystals, and the concentration of cyclopentyllithium in solution is 2.89 molar.

EXAMPLE 2

Following the procedure of Example 1, 132 g. of cyclopentyl chloride are added to 200 ml. of sodium-dried cyclohexane containing 17 g. of lithium (plus 1% sodium) dispersion at 45° C. over a period of 1¾ hours. The mixture is stirred for an additional hour and allowed to cool to room temperature. The concentration of cyclopentyllithium in the resulting solution is 2.78 molar, and the solution is saturated with respect to cyclopentyllithium.

Another 150 ml. of cyclohexane is added, and the solution filtered. The concentration of cyclopentyllithium in the filtrate is 2.74 molar at 23° C.

The yield of cyclopentyllithium is 95%.

EXAMPLE 3

Following the procedure of Example 1, 49 g. of cyclopentyl chloride is added to 250 ml. of sodium-dried benzene containing 8.5 g. of lithium (plus 1% sodium) dispersion over a period of 1¼ hours, the temperature being maintained at 35° C. The reaction mixture is stirred for an additional 1½ hours and then filtered. The concentration of the cyclopentyllithium in the solution is 1.56 molar, and the solution is not saturated, containing 13.7%, by weight, of cyclopentyllithium. The yield of cyclopentyllithium is 80%.

EXAMPLE 4

Following the procedure of Example 1, 100 g. of cyclopentyl chloride is added to 200 ml. of methylcyclohexane containing 14 g. of lithium (plus 1% sodium) dispersion over a period of 1½ hours, the temperature being maintained at 45° C. The reaction mixture is stirred for an additional hour, cooled and filtered. The solution is saturated with cyclopentyllithium at 23° C. (2.57 molar or 24.1%, by weight).

EXAMPLE 5

Following the procedure of Example 1, 100 g. of cyclopentyl chloride is added to 150 ml. of benzene containing 14 g. of lithium (plus 1% sodium) dispersion over a period of 1½ hours, the temperature being maintained at 40–45° C. The reaction mixture is stirred, at room temperature, for an additional hour and filtered. The solution is saturated with cyclopentyllithium at 23° C. (2.8 molar or 23.7%, by weight).

EXAMPLE 6

Following the procedure of Example 1, 128 g. of cyclopentylbromide is added to 150 ml. of cyclohexane containing 14 g. of lithium (plus 1% sodium) dispersion over a period of 2 hours at 45–50° C. The mixture is stirred for an additional hour and filtered. The resulting solution contains 17.8%, by weight, of cyclopentyllithium (1.90 molar).

Modification is possible in procedural techniques without departing from the scope of the invention.

What is claimed is:

1. A process for preparing cyclopentyllithium which comprises reacting one mol of a cyclopentyl halide selected from the group consisting of cyclopentyl chloride and cyclopentyl bromide with two mols of finely-divided lithium metal in a liquid cyclic hydrocarbon having a total number of carbon atoms of from 5 to 10, the concentration of said reactants providing a concentration of cyclopentyllithium of at least 1.56 molar.

2. The process of claim 1 wherein said cyclopentyl halide is the chloride.

3. The process of claim 1 wherein said lithium is in the form of a dispersion thereof; and wherein sodium is mixed with said lithium in an amount from about 0.3 to about 2%, by weight, based on the weight of the lithium.

4. The process of claim 1 wherein said cyclic hydrocarbon is at least one of those selected from the group consisting of cyclopentane, cyclohexane, methylcyclohexane and benzene.

5. The process of claim 4 wherein said lithium is in the form of a dispersion thereof; wherein sodium is mixed with said lithium in an amount from about 0.3 to about 2%, by weight, based on the weight of the lithium, and wherein the concentration of said reactants provide a concentration of cyclopentyllithium of at least 2 molar.

6. The process of claim 5 wherein the concentration of said reactants provide a concentration of cyclopenyllithium of substantially saturation.

References Cited

Applequist et al.: J. Am. Chem. Soc., 85 (1963), pp. 743–8.

Weissberger: Techniques of Organic Chemistry, vol. III (1956), 2nd ed., Interscience Publishers Inc., New York, N.Y., p. 549.

TOBIAS E. LEVOW, Primary Examiner

A. P. DEMERS, Assistant Examiner